United States Patent [19]
Martin

[11] Patent Number: 5,414,951
[45] Date of Patent: May 16, 1995

[54] FISHING TACKLE HAVING FIBER OPTIC IMAGE TRANSMISSION

[76] Inventor: Jerry L. Martin, 6387 Dove St., Norfolk, Va. 23515

[21] Appl. No.: 228,529

[22] Filed: Apr. 15, 1994

[51] Int. Cl.⁶ ............... A01K 85/01; A01K 91/00
[52] U.S. Cl. ............................................. 43/17.5
[58] Field of Search ............... 43/4, 17.5, 17.6, 44.98

[56] References Cited

U.S. PATENT DOCUMENTS

| | | |
|---|---|---|
| 2,864,195 | 12/1958 | Bachmann . |
| 3,464,137 | 9/1969 | England . |
| 4,422,258 | 12/1983 | Adams . |
| 4,485,398 | 11/1984 | Chapin, Jr. . |
| 4,519,391 | 5/1985 | Murakoshi . |
| 4,556,930 | 12/1985 | Mori . |
| 4,617,715 | 10/1986 | Johansson . |
| 4,621,447 | 11/1986 | Rhodes . |
| 4,899,480 | 2/1990 | Park .................................. 43/4 |
| 5,063,700 | 11/1991 | Kiefer . |
| 5,205,061 | 4/1993 | Echols, Jr. . |
| 5,257,100 | 10/1993 | Hattori . |

FOREIGN PATENT DOCUMENTS

| | | | |
|---|---|---|---|
| 2161051 | 1/1986 | United Kingdom | 43/17.5 |
| 8809120 | 12/1988 | WIPO | 43/17.5 |

*Primary Examiner*—Kurt Rowan
*Attorney, Agent, or Firm*—Shlesinger, Arkwright, & Garvey

[57] ABSTRACT

A video fishing device that enables a user to receive a transmitted visual image of activity occurring around the bait or lure during fishing comprising a fishing tool for retrieving and deploying a length of fishing line, the tool including a length of fishing line having a distal end and a proximal end, a length of illumination and visualization fibers for conducting light distally and an image proximally, the length of fibers associated with the length of fishing line and optical components operatively associated with the length of fibers to enable remote viewing at the fishing line proximal end of the region adjacent the fishing line distal end when the line is deployed during fishing.

15 Claims, 1 Drawing Sheet

FISHING TACKLE HAVING FIBER OPTIC IMAGE TRANSMISSION

FIELD OF THE INVENTION

The present invention relates to video fishing tackle and more particularly to a fishing apparatus of the rod and reel type having the capability to transmit a visual image to the user of the region around the bait or lure while fishing.

BACKGROUND OF THE INVENTION

Sport and recreational fishing generally involves the use of fishing tackle, typically a fishing pole or rod in combination with a reel adapted to selectively receive and deploy a length of fishing line. A hook is secured to the end of the line to hold a bait or artificial lure which is then cast into the open water to deceive a fish into striking it, thereby allowing it to be caught.

Unless the fish strikes within view of the bait or lure, most fisherman look for telltale movement in the rod tip or the line for indications of an impending strike. This involves guesswork and is of course highly unreliable, especially to the novice.

Prior art visual aids for fisherman include sonar units that emit a high frequency sound and provide a graphic recording of the region being fished or sensors that alert the fisherman to subtle movements in the line or the fishing rod. Although underwater cameras are known to exist, for example U.S. Pat. No. 4,485,398 (Chapin, Jr. et al.), these devices have no practical application for the recreational fisherman.

The advent of fiber optic technology has enabled the transmission of images through extremely thin diameter lines. Bulky transmission cables and lenses have been replaced by super-thin, sheathed light guides that transmit light to illuminate a target area and convey the image back to a camera. Operational tube diameters as small as 0.25 mm have now been achieved.

Although fiber optic light guides have been employed in fishing line as a means to attract fish, for example U.S. Pat. No. 4,617,751 (Johansson), no prior art fishing tackle exists that enables a user to receive a visual image at the fishing pole of the region adjacent the bait or lure when fishing. It is against this background that the present invention was developed.

OBJECTS AND SUMMARY OF THE INVENTION

It is therefore an object of the present invention to provide a fishing device comprising a rod and reel that includes a fiber optic fishing line and optical components enabling a user to receive an image on a monitor mounted to the rod and reel of the region adjacent the bait or lure.

It is another object of the present invention to provide fishing tackle that greatly improves the users chances to catch fish by providing visual assistance to the fisherman thereby increasing his sensory perception while fishing.

It is still another object of the present invention to provide a video fishing device of the rod and reel type which increases the users attention span and interest by allowing the fisherman to be aware of activity occurring around the bait and therefore anticipate a strike before it happens.

It is yet another object of the present invention to provide a fishing device that conveys to the user a video image of the underwater region being fished so that a more productive region to be fished can be located.

It is still a further object of the present invention to provide fishing tackle having the dual capability of allowing a user to hook and catch a fish as well as view the region adjacent the bait or lure while fishing.

In summary, the present invention is directed to a video fishing device that enables a user to receive a transmitted visual image of activity occurring around the bait or lure during fishing comprising a fishing tool for retrieving and deploying a length of fishing line, the tool including a length of fishing line having a distal end and a proximal end, a length of illumination and visualization fibers for conducting light distally and an image proximally, the length of fibers are associated with the length of fishing line and optical components operatively associated with said length of fibers to enable remote viewing at the fishing line proximal end of the region adjacent the fishing line distal end when the line is deployed during fishing.

The present invention is also directed to a video fishing device that enables a user to receive a transmitted visual image of activity occurring around the bait or lure during fishing comprising a fishing tool adapted for retrieving and deploying a length of line, a length of fishing line having a distal end and a proximal end, the length of fishing line is in the form of a light guide capable of conducting light to the distal end and conducting an image to the proximal end, the length of line is retrievable and deployable by the fishing tool, optical components operatively associated with the length of line and the fishing tool to provide remote viewing at the length of line proximal end of the region adjacent the length of line distal end while the line is deployed during fishing.

These and other objects of the present invention will become apparent from the following detailed description.

BRIEF DESCRIPTIONS OF THE DRAWINGS

DETAILED DESCRIPTION OF THE INVENTION

Figure 1:
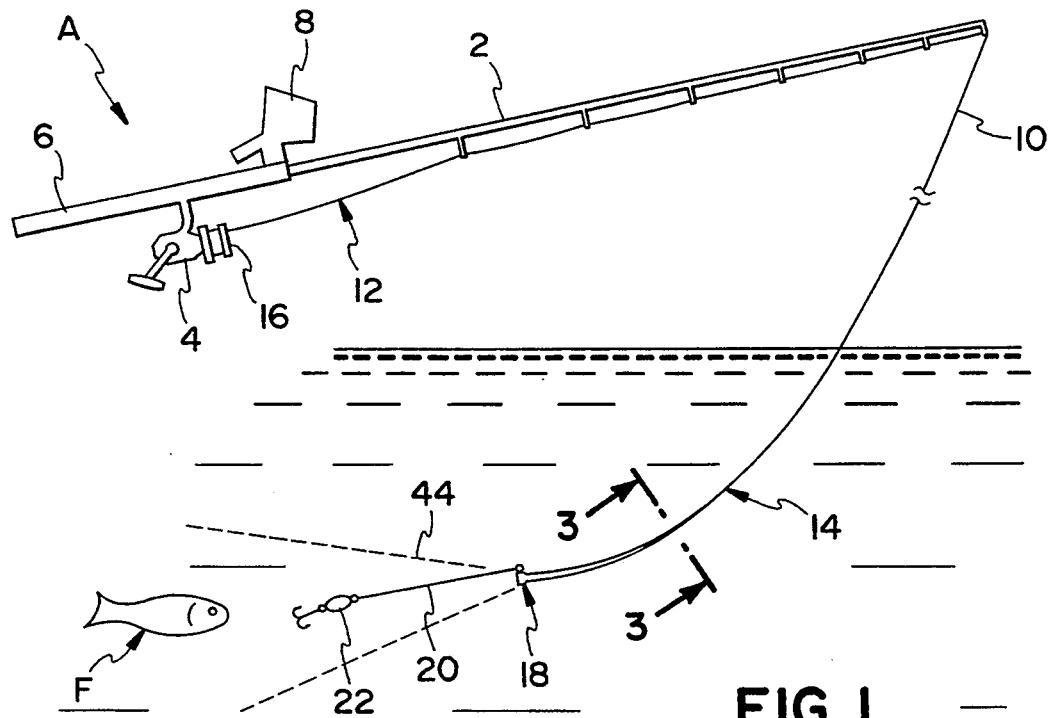
FIG. 1 illustrates the video fishing device according to the present invention in its entirety with the fishing line deployed and with portions shown in broken lines.

Referring to FIG. 1 of the accompanying drawings, there is illustrated the video fishing device A according to the present invention. The video fishing device A includes a fishing rod 2 having a fishing reel 4 affixed at the handle region 6. A video monitor or TV screen 8 is also shown mounted to the handle 6. Fiber optic fishing line 10 is shown in a deployed position away from the video fishing device A. The fiber optic fishing line 10 generally includes a proximal end 12 and an opposite distal end 14. As can be appreciated, the fishing line 10 is stored at its proximal end 12 on a spool 16 of fishing reel 4. The fishing reel 4 operates to deploy and retrieve the fiber optic fishing line 10 in a manner well known in the art. It is within the scope of the present invention to provide a fishing reel 4 which is a spinning-type reel, closed-face type reel or bait casting type reel.

The distal end 14 of fiber optic fishing line 10 includes a viewing head 18 which will be explained in greater detail below. A leader 20 may be secured at one end to the viewing head 18 of fiber optic fishing line 10. The opposite end of the leader 20 is secured to a lure or bait 22 as is known in the art.

Figure 2:
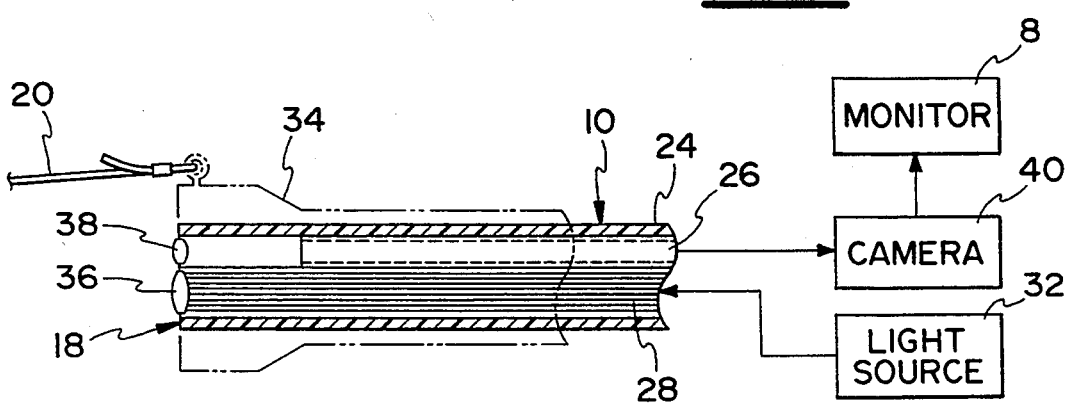
FIG. 2 illustrates a longitudinal sectional view of the distal end of the fiber optic fishing line according to the present invention including a schematic diagram of the optical components.

Turning now to FIG. 2, the distal end of fiber optic fishing line 10 is shown in greater detail. The fiber optic fishing line 10 includes a flexible sheath or casing 24 having considerable length and accommodating an image guide 26 and light guide 28 extending therethrough the length of fishing line 10. The image guide 26 may take the form of a coherent light fiber optic bundle that is flexible.

Figure 3:
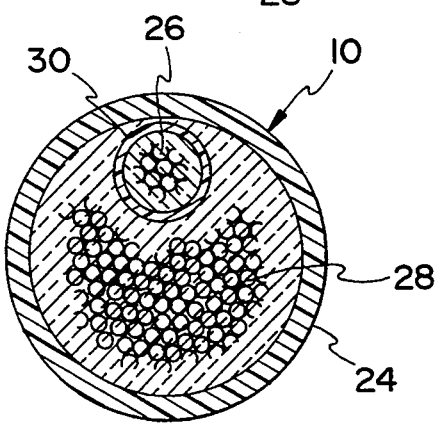
FIG. 3 is a cross-sectional view taken along lines 3—3 of FIG. 1 and illustrating the discrete fiber optic bundles encased in the sheath forming the fishing line.

As best shown in FIG. 3, the bundle of image guide fibers 26 is enclosed in a skin layer 30 of silicon glass which may be further enclosed in a reinforcing layer (not shown). Each individual image guide fiber within the bundle 26 has a silicon glass core and silicon glass cladding as is known to form a picture element. The light guide bundle 28 also comprises a number of individual fibers for conveying radiant energy from a remote light source 32.

Both the image guide 26 and light guide 28 should have good optical transmission properties and a refractive index higher than that of sheath or casing 24. The material of the bundles is not restricted to glass fibers but may be plastic, for example polymethyl-methacrylate or polystyrene while the casing may consist of silicone-rubber materials. The diameter of each image guide fiber is extremely small between 4 and 6 $\mu$m. As is known in the art, the greater the number of individual fibers within the image guide the better the resolution of the transmitted image. The diameter of the individual light guide fibers may be larger and in the order of 20 $\mu$m to 50 $\mu$m since the illumination light is not an ordered light but incoherent. The diameter of the individual light guides may be larger than that of the image guide fibers however it is preferable to limit the size of the light guide fibers to prevent inflexibility of the fishing line 10. The net result is that the overall diameter of the fishing line is about 0.5 mm.

The image guide 26 and light guide 28 terminate at the viewing head 18 positioned at distal end 14 of fishing line 10. Viewing head 18 may include a casing 34 (shown in phantom lines) to provide an anchor for leader 20 as well as to house optical components positioned. In the alternative, the leader 20 is unitary with and co-extensive from viewing head 18. A light distributing lens 36 is provided at the end of light guide 28 while a objective lens 38 is provided at the end of image guide 26. The opposite or proximal end 12 of image guide 26 is connected to a television camera 40 and eventually a monitor 42.

The light emitted from light source 32 is transmitted along the length of light guide 28 to the light distributing lens 36 within viewing head 18 to illuminate an object to be imaged. The illuminate object, in the present instance a fish F, enters focal plane 44 of objective lens 38. The image is received by the objective lens 38 and transmitted along the image guide 26 to the camera 40.

Television camera 40 is provided with an image forming lens (not shown) adapted to receive the object image transmitted by the objective lens 38. The television camera 40 further includes a solid state imaging device adapted to pick up the image from the camera lens. The imaging device will convert the image into an electric signal which is received by a camera controlling unit (not shown) that converts the signal into a video signal. The video signal will then be reconverted by the video monitor 8 into a visual image for view at the fishing rod 2. A similar signal transmission system is described in greater detail in U.S. Pat. Nos. 5,254,100 and 4,519,391 the pertinent portions of which are incorporated herein by reference.

In operation, the lure or bait 22 is manually cast or deployed in a conventional manner via fishing rod 2 into a region to be fished. The video monitor 8 is turned on and light source 32 will transmit light to illuminate the region surrounding the lure 22. Activity occurring within the focal plane 44 of the object lens 38 is illuminated and the image is then transmitted by image guide 26 for processing by camera 40 into a video signal. The signal is subsequently converted into an image displayed by monitor 8. A fish or other object nearing the lure 22 can therefore be viewed by a user of the device. As can be appreciated, the signal transmitted by light source 32 and received by camera 40 is directed through the fishing reel 4 by appropriate electrical connection to the monitor 8 and camera 40.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

What is claimed is:

1. A video fishing device that enables a user to receive a transmitted visual image of activity occurring around the bait or lure during fishing comprising:
    a) a fishing tool for retrieving and deploying a length of fishing line, said tool including a length of fishing line having a distal end and a proximal end;
    b) a length of illumination and visualization fibers for conducting light distally and an image proximally, said length of fibers associated with said length of fishing line;
    c) optical components operatively associated with said length of fibers to provide remote viewing at said fishing line proximal end of the region adjacent said fishing line distal end when said line is deployed during fishing;
    d) said optical components including a viewing head positioned at said fishing line distal end and a television camera and monitor positioned at said fishing line proximal end, said viewing head and said television camera and monitor disposed at opposite ends of said length of fibers;
    e) said viewing head including a light distributing lens for illuminating the region adjacent said distal end and an objective lens for obtaining an object image of the illuminated region; and
    f) said television camera and monitor adapted to receive and display the object image obtained by said objective lens.

2. A fishing device as in claim 1 and wherein:
    a) said length of fibers positioned adjacent said length of fishing line and capable of being simultaneously retrieved and deployed therewith.

3. A fishing device as in claim 1, and wherein:

a) said length of fibers coaxially disposed within said length of fishing line.

4. A fishing device as in claim 1 and wherein;
a) said television camera including an image forming lens adapted to receive an object image at said fishing line proximal end and a solid state imaging device adapted to receive and convert the object image from said image forming lens into an electrical signal to be processed by said video monitor for visual display.

5. A fishing device as set forth in claim 4 and wherein:
a) said optical components further including a light source positioned at said length of fishing line proximal end to provide light, the light being transmitted by said length of fibers to said light distributing lens for illumination purposes.

6. A fishing device as set forth in claim 1 and wherein:
a) said length of illumination and visualization fibers comprising a discrete bundle of light transmission fibers for transmitting light and a discrete bundle of image guide fibers, each of said bundles being enclosed in a single, unitary thin walled sheath.

7. A fishing device as set forth in claim 1 and wherein:
a) said length of fishing line extending beyond said viewing head so that a hook attached to the end of said fishing line will fall within the focal plane of said viewing head.

8. A fishing device as set forth in claim 1 and further comprising:
a) a fishing leader having first and second ends, said fishing leader first end secured to said viewing head and said fishing leader second end provided with a hook for holding a bait or lure.

9. A video fishing device that enables a user to receive a transmitted visual image of activity occurring around the bait or lure during fishing comprising:
a) a fishing tool for retrieving and deploying a length of line for fishing purposes;
b) a length of fishing line having a distal end and a proximal end, said length of fishing line in the form of a light guide capable of conducting light to said distal end and conducting an image to said proximal end, said length of line is retrievable and deployable by said fishing tool;
c) optical components operatively associated with said length of line and said fishing tool to provide remote viewing at said length of line proximal end of the region adjacent said length of line distal end while said line is deployed during fishing;
d) said optical components including a viewing head positioned at said fishing line distal end and a television camera and monitor positioned at said fishing line proximal end, said viewing head and said television camera and monitor disposed at opposite ends of said length of fibers;
e) said viewing head including a light distributing lens for illuminating the region adjacent said distal end and an objective lens for obtaining an object image of said illuminated region; and
f) said television camera and monitor adapted to receive and display the object image obtained by said objective lens.

10. A fishing device as in claim 9 and wherein;
a) said television camera including an image forming lens adapted to receive an object image at said fishing line proximal end and a solid state imaging device adapted to receive and convert the object image from said image forming lens into an electrical signal to be processed by said video monitor for visual display.

11. A fishing device as set forth in claim 10 and wherein:
a) said optical components further including a light source positioned at said length of fishing line proximal end to provide light, the light being transmitted by said fishing line to said light distributing lens for illumination purposes.

12. A fishing device as set forth in claim 9 and wherein:
a) said length of fishing line comprising a discrete bundle of glass light fibers for transmitting light and a discrete bundle of image guide fibers, each of said bundles being enclosed in a single, unitary thin walled sheath.

13. A fishing device as set forth in claim 9 and wherein:
a) said length of fishing line extending beyond said viewing head so that a hook attached to the end of said fishing line will fall within the field of view of said viewing head.

14. A fishing device as set forth in claim 9 and further comprising:
a) a fishing leader having first and second ends, said fishing leader first end secured to said viewing head and said fishing leader second end provided with a hook for holding a bait or lure.

15. A video fishing device that enables a user to receive a transmitted visual image of activity occurring around the bait or lure during fishing comprising:
a) a fishing tool for retrieving and deploying a length of fishing line, said tool including a length of fishing line having a distal end and a proximal end;
b) a length of illumination and visualization fibers for conducting light distally and an image proximally, said length of fibers associated with said length of fishing line;
c) optical components operatively associated with said length of fibers to provide remote viewing at said fishing line proximal end of the region adjacent said fishing line distal end when said line is deployed during fishing;
d) said optical components including a viewing head positioned at said fishing line distal end and a television camera and monitor positioned at said fishing line proximal end, said viewing head and said television camera and monitor disposed at opposite ends of said length of fibers;
e) said viewing head including a light distributing lens for illuminating the region adjacent said distal end and an objective lens for obtaining an object image of said illuminated region;
f) said television camera and monitor adapted to receive and display the object image obtained by said objective lens;
g) said fishing tool including a rod and reel; and
h) said television camera and monitor are mounted to said rod and reel.

* * * * *